(12) United States Patent
LaSee

(10) Patent No.: US 6,776,374 B2
(45) Date of Patent: Aug. 17, 2004

(54) PARACHUTE PACK FOR POWERED PARACHUTE

(75) Inventor: Jack C. LaSee, Abbotsford, WI (US)

(73) Assignee: Abby Air LLC, Abbotsford, WI (US)

( * ) Notice: Subject to any disclaimer, the term of this patent is extended or adjusted under 35 U.S.C. 154(b) by 0 days.

(21) Appl. No.: 10/350,210

(22) Filed: Jan. 22, 2003

(65) Prior Publication Data

US 2003/0136880 A1 Jul. 24, 2003

Related U.S. Application Data

(60) Provisional application No. 60/351,021, filed on Jan. 23, 2002.

(51) Int. Cl.[7] .............................................. B64D 17/40
(52) U.S. Cl. ....................................... 244/148; 244/139
(58) Field of Search ................................ 244/147, 148, 244/149, 702, 903, 13, 2, 139

(56) References Cited

U.S. PATENT DOCUMENTS

| | | | | |
|---|---|---|---|---|
| 1,462,456 A | * | 7/1923 | Smith ........................... | 244/148 |
| 2,130,569 A | * | 9/1938 | Smith ........................... | 244/148 |
| 2,366,764 A | * | 1/1945 | Wilson ......................... | 244/148 |
| 2,508,754 A | * | 5/1950 | Frieder et al. ............... | 244/148 |
| 2,583,905 A | * | 1/1952 | Thompson .................... | 244/148 |
| 3,690,604 A | * | 9/1972 | Guilfoyle ..................... | 244/148 |
| 3,830,453 A | * | 8/1974 | Cannarozzo .................. | 244/148 |
| 4,087,063 A | * | 5/1978 | Caffey .......................... | 244/148 |
| 6,322,021 B1 | * | 11/2001 | Fisher et al. .................. | 244/49 |
| 6,565,041 B1 | * | 5/2003 | Young et al. ................. | 244/139 |

\* cited by examiner

*Primary Examiner*—Charles T. Jordan
*Assistant Examiner*—T. Nguyen
(74) *Attorney, Agent, or Firm*—Keith M. Baxter

(57) ABSTRACT

An improved pack for parachutes for powered parachute aircraft breaks down to lie flat against the ground providing a staging area for folding the parachute and full access to the parachute to remove entrapped air. Flaps of the pack fold up around the parachute to create an enclosure. The pack may include attached bungee cords for tying it to the frame of the cockpit and may be part of a kit including line socks and frame attachment hooks.

11 Claims, 4 Drawing Sheets

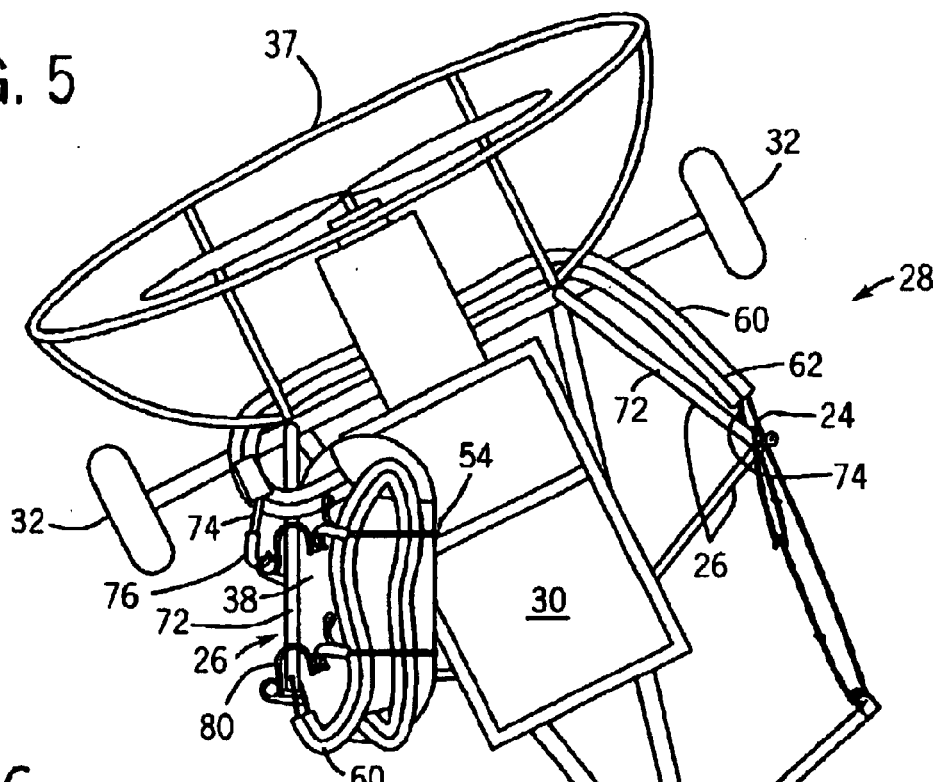
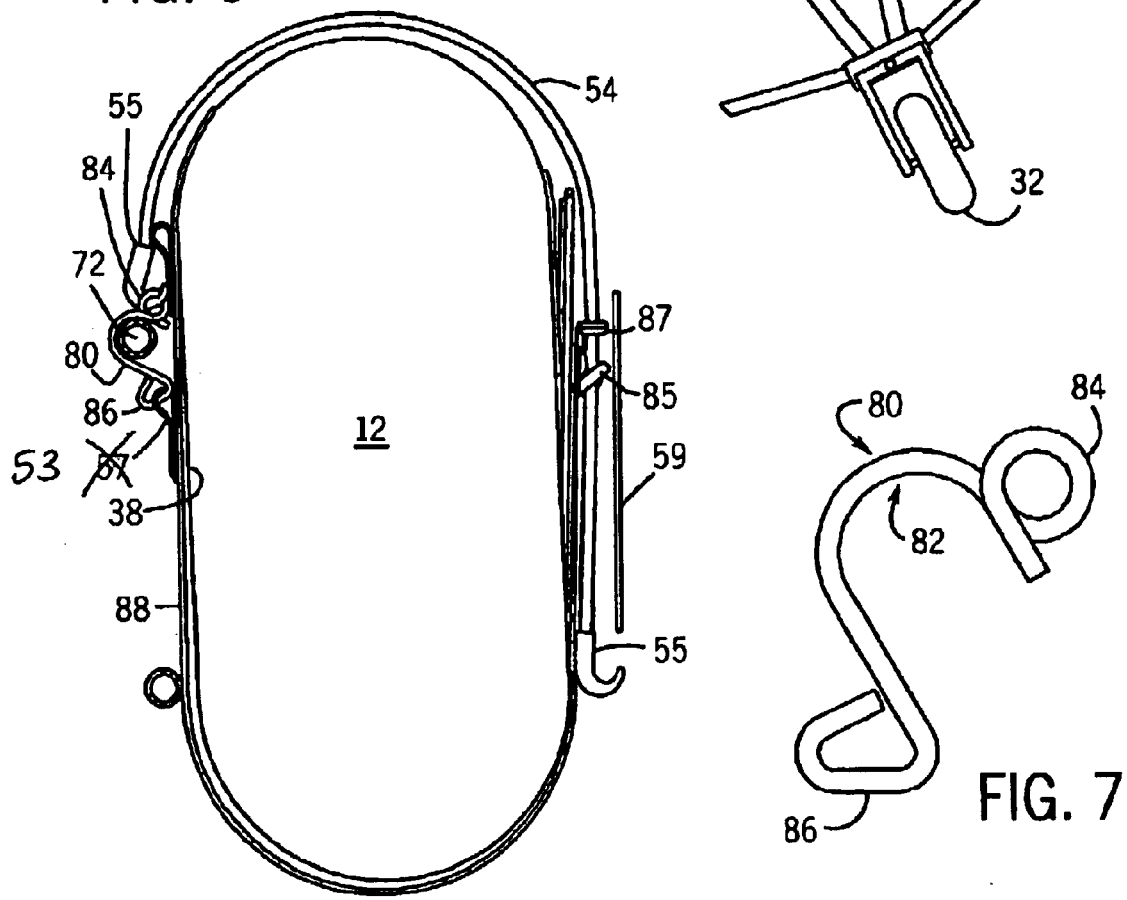

PARACHUTE PACK FOR POWERED PARACHUTE

CROSS-REFERENCE TO RELATED APPLICATIONS

This application is based on provisional application No. 60/351,021 filed Jan. 23, 2002 and claims the benefit thereof.

STATEMENT REGARDING FEDERALLY SPONSORED RESEARCH OR DEVELOPMENT

BACKGROUND OF THE INVENTION

The present invention relates to aircraft using a parachute as a wing ("powered parachute") and, in particular, to a method and apparatus for storing the parachute "wing" of a powered parachute.

A powered parachute is a flexible wing aircraft using a parachute to provide a lifting surface. A cockpit, suspended below the wing by multiple, flexible lines, supports a motorized propeller that provides forward thrust. The parachute wing is made up of multiple cells open along the wing's leading edge to receive air that inflates the cells holding the parachute in the proper airfoil shape. Parachutes range in size from 400–550 square feet being approximately fourteen feet from front to back and thirty-seven feet wide.

At the beginning of a flight, the parachute is placed flat on the ground behind the cockpit which rests on wheels. As the cockpit moves forward driven by the propeller, the parachute wing "kites up" and begins to take the shape of an airfoil. Once the wing is fully inflated, additional cockpit speed allows the parachute to lift the cockpit up off the ground.

Landing is accomplished by reducing the propeller thrust allowing the cockpit to descend to a runway. As the cockpit comes to a rest, the parachute settles on the ground behind the cockpit.

During times when the powered parachute is not in use, the parachute must be folded and stored. Proper protection of the parachute and the lines connecting it to the cockpit is necessary to prolong the useful life and to ensure safe operation of the powered parachute.

The parachute is typically stored in an envelope-shaped bag. Such storage is difficult because of the tendency of the zero-porosity parachute material to retain air and thus to balloon up inside the bag as the bag is stuffed.

BRIEF SUMMARY OF THE INVENTION

The present invention provides an improved storage system for the parachute of a powered parachute. The system uses a storage pack that may be unfolded into a flat sheet providing complete access to the parachute as it is bundled in the center of the sheet. The storage pack is then assembled about the parachute by means of fasteners on edges of the sheet. This greater accessibility to the parachute during the storage process allows improved removal of entrapped air. Further, the wrapping action simplifies the storage process.

Specifically, the present invention provides a parachute pack for powered parachutes comprising a sheet of flexible material that in a first state is openable to lie flat against a ground surface and sized to receive a parachute thereupon. Fasteners positioned near edges of the sheet allow the edges of the sheet to be drawn over a received parachute in a second state, to enclose the parachute; the fasteners interconnecting to releasably retain the edges to each other.

Thus, it is one object of the invention to provide an improved protective storage pack for a parachute of a powered parachute. By allowing the storage pack to be broken down to a flat sheet, the time and effort required to pack the parachute is minimized.

The fasteners may be hook and loop fasteners.

Thus, it is another object of the invention to provide a flexible fastener compatible with the sheets and unlikely to damage the parachute.

At least a portion of the fasteners may be placed on a surface of the sheet lying next to the ground when the sheet is in the opened state.

Thus, it is another object of the invention to minimize the chance of the fasteners from snagging material on the ground.

The fasteners may provide a range of connection points to allow a volume enclosed by the sheet in the second state to be varied.

Thus it is another object of the invention to both provide a pack that is suitable for a variety of different parachutes and that allows cinching of the pack as air is removed from the parachute.

The edges of the sheet may extend in four pairwise opposed flaps and the fasteners may be positioned on edges of the flaps.

Thus, it is another object of the invention to provide a design that is efficient in its use of material and that eliminates the interference of bunching of the sheet as the flaps are drawn about the parachute.

The sheet may be a gas permeable fabric.

Thus, it is another object of the invention to provide for a path of moisture escape from the stored parachute.

The sheet may include attached straps sized to retain the enclosed parachute when the parachute is wrapped in the sheet and to hold the enclosed parachute to a structure of the cockpit.

Thus, it is another object of the invention to provide a method of storing the wrapped parachute in a fixed location on the cockpit to prevent damage to the parachute.

The flexible sheet may be part of a kit including socks comprising tubular sleeves of flexible material separable along their length by a releasable fastening means and sized to substantially cover lines attaching the parachute to the cockpit.

Thus, it is another object of the invention to provide a complete system for storing and protecting the parachute and its lines when the powered parachute is being stored.

The kit may further include straps sized to hold the stored parachute to the structure of the cockpit. The kit may also include rigid hooks sized to engage a strut of the cockpit to provide attachment points for at least one releasable strap.

It is thus another object of the invention to provide for storage of the parachute in a position other than the seat so as to provide improved access to the seat during taxiing and the like.

The present invention is particularly useful with a method of packing the parachute in which the parachute is collected by collecting the parachute along an axis extending from a front of the parachute to a back of the parachute and fan-folding the rolled parachute on the sheet to reduce its front to back dimensions. The open construction of the present pack allows a single individual to fold the parachute and compress air from the folds upon the protective surface of the unfolded sheet.

These particular objects and advantages may apply to only some embodiments falling within the claims and thus do not define the scope of the invention.

BRIEF DESCRIPTION OF THE DRAWINGS

FIG. 5 is a plan view of the cockpit of FIG. 2 with the parachute as stored in the storage pack of the present invention and attached to structure of the cockpit also showing positioning of the parachute lines in protective socks;

FIG. 6 is a side elevational cross-section of the folded parachute of FIG. 5 showing its retention by a bungee cord, a second strap, and a hook fitting on a horizontal strut of the cockpit;

FIG. 7 is a detailed view of the hook of FIG. 6;

DETAILED DESCRIPTION OF THE PREFERRED EMBODIMENT

Figure 1:
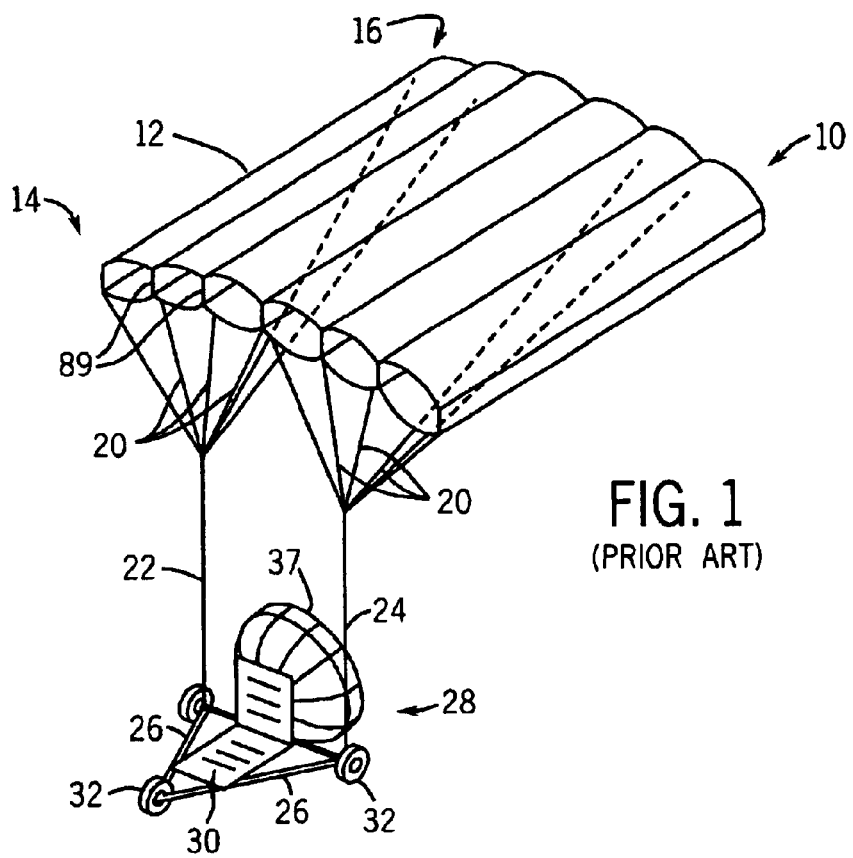
FIG. 1 is a simplified perspective view of a powered parachute showing the parachute wing inflated and supporting the cockpit.

Referring now to FIG. 1, a powered parachute 10 includes a parachute 12 having a leading edge 14 and a trailing edge 16. Extending from the leading edge 14 to the trailing edge 16 are fabric cells having vertical Mylar stiffeners 89 open at the leading edge 14 and closed at the trailing edge 16 so as to capture air and to provide the parachute 12 with a desired aerodynamic shape.

A series of lines 20 connect points on the parachute 12 to left and right support cables 22 and 24, respectively. The support cables 22 and 24 are attached to corresponding outriggers 26 extending from the left and right of the cockpit 28. The cockpit 28 provides a seat 30 for the pilot (not shown), a set of wheels 32 for taxiing and, a rear mounted motor and pusher propeller the latter having a propeller guard 37 and providing propulsion for the powered parachute 10.

Figure 2:
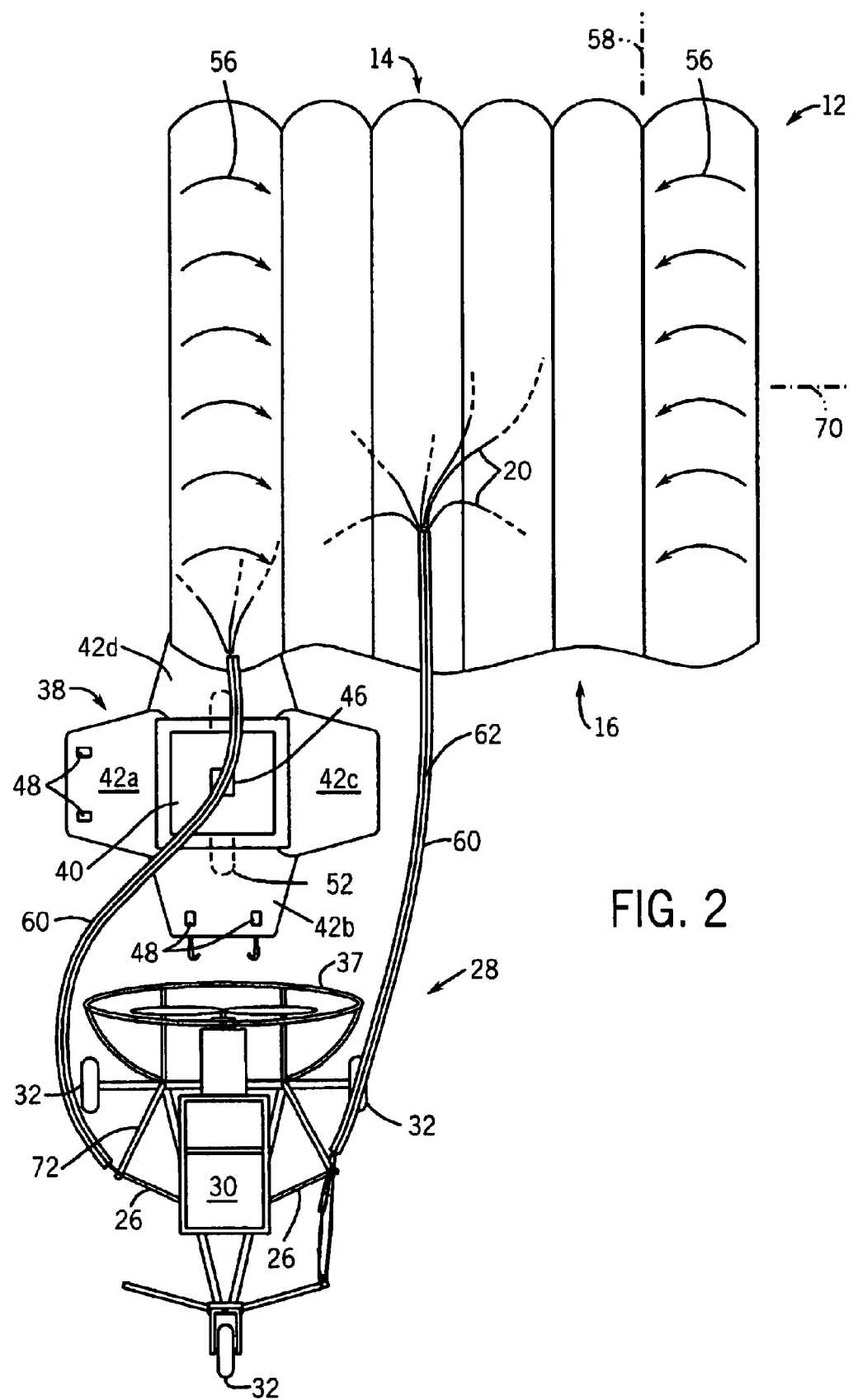
FIG. 2 is a plan view of the cockpit and parachute wing on the ground with the parachute wing arranged behind the cockpit and next to the storage pack according to a preferred packing method.
Figure 9:
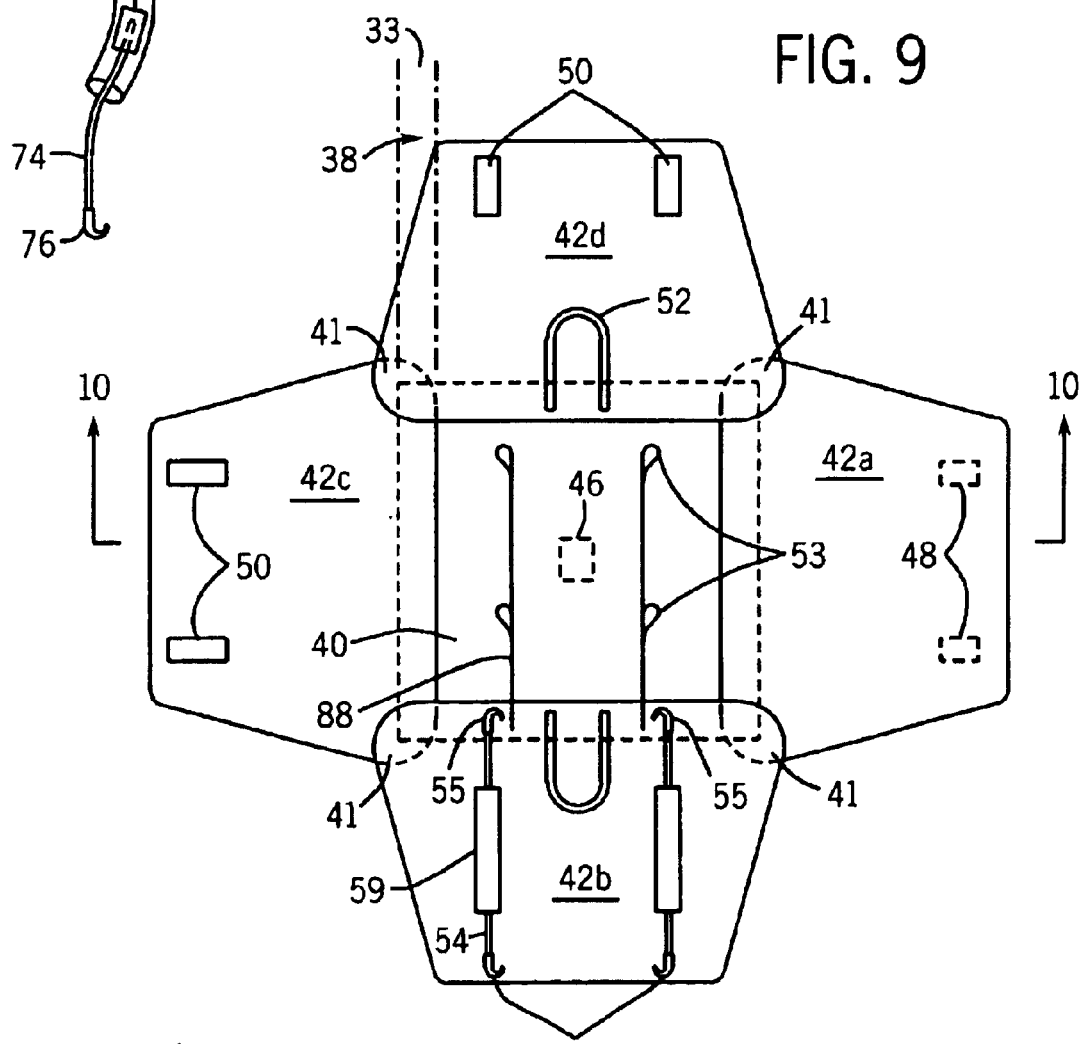
FIG. 9 is a bottom plan view of the storage pack in a flattened configuration.

Referring now to FIGS. 2 and 9, when the cockpit 28 is on the ground, for example after landing, the parachute 12 will generally have fallen upside down with the open cells of the leading edge 14 to the back. If not, the parachute 12 may be arranged in this position in preparation for folding.

Figure 10:
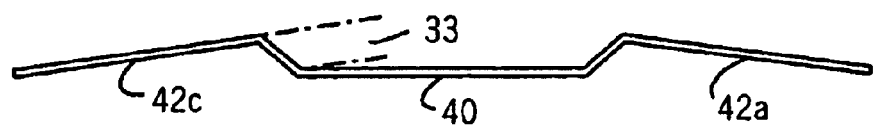
FIG. 10 is a cross sectional view along lines 10—10 through FIG. 9.

The storage pack 38 of the present invention may then be positioned on the ground between the cockpit 28 and the parachute 12. Initially, the storage pack 38 is in an unfolded state providing an essentially planar sheet lying flat against the ground. A generally square center portion 40 of the unfolded storage pack 38 attaches at its four edges to four corresponding flaps 42a, 42b, 42c and 42d so that flaps 42a and 42c pairwise opposite to each other from left to right and flaps 42b and 42d pairwise opposite to each other from front to back. The flaps 42a, 42b, 42c and 42d are trapezoidal having their longer base abutting the edges of the center portion 40 and their narrower bases removed therefrom. The center of the square center portion 40 may be marked with a panel 46 to aid in the packing process as will be described. The corners of the square center portion 40 include darts or notches (not shown) that when sewn gather the material of the square center portion 40 into a shallow tray (shown in FIG. 10) having upward edges that are substantially lower than the height of the parachute 12 when the parachute 12 is bundled on the square center portion 40. The upward edges of the tray allow the square center portion 40 to lie substantially flat against the ground and the tray edges have a length 33 of about a third of the length of the flaps 42 and substantially less than half the flap length.

The storage pack 38 is preferably constructed from a flexible material, preferably a fabric.

Referring still to FIGS. 2 and 9, the distal edges of flaps 42a and 42b hold panels 48 providing hook portions of a hook and loop fastener such is sold under the trade name of Velcro™. The panels 48 holding the hook portions are on the "parachute side" of the storage pack 38 normally away from the ground to keep them from picking up debris.

Correspondingly, the distal edges of flaps 42d and 42c hold panels 50 providing the loop portions of the hook and loop fasteners. The panels 50 holding the loop portions are on the "ground side" of the storage pack 38 normally toward the ground. The loop portions extend a length along the flaps 42c and 42d between their distal and proximal edges to provide a plurality of locations at which the hook portions of the panels 48 may attach. This allows a cinching of storage pack 38 as will be described and the accommodation of parachutes 12 folding to different sizes or different folding techniques. The length of the flaps 42a, 42b, 42c and 42d at their bases is longer than the sides of the sewn square center portion 40 (as shortened by the sewn darts) so that corners 41 of the flaps overlap each other at the corners of the square center portion 40 by about eight inches providing ample room for adjustment of the volume of the storage pack 38 for accommodation of different sizes of parachutes 12 and further ensuring overlap in the corner base edges of the flaps to ensure the parachute 12 does not protrude from the pack 38 corners. These edges, although overlapping, are not sealed and thus allow moisture to escape from the parachute 12.

The ground side of the storage pack 38 also includes lifting straps 52 attached to the material of the storage pack 38 by sewn panels as is understood in the art and bungee cords 54 attached to flap 42b and extending between the base out of the flap 42b to provide for a securing of the completed pack to the cockpit 28 as will be described further below. Attachment loops 53 are provided in the square center portion 40 for attachment of the storage pack 38 to the structure of the powered parachute 10 as will be described.

Referring now to FIG. 2, after storage pack 38 is positioned between the cockpit 28 and the parachute 12, a number of different packing techniques may be used. In a first technique, the parachute 12 is rolled from left and right edges to center as indicated by arrows 56 to gather it into a row extending along an axis 58 between the leading edge 14 and trailing edge 16 of the parachute 12. When this process is complete, this relatively narrow row of parachute 12 will be positioned near the storage pack 38 for fan folding as will be described. The parachute 12 should be compressed to be 2–3 feet wide at this point.

In a second method of packing the parachute 12, the person packing the parachute 12 centers his or herself at the leading edge 14 and without moving gathers every second open cell by grabbing the lines 20 attached to the leading edge 14 of the parachute 12 about six inches from the fabric of the parachute 12. After doing so, the Mylar stiffeners 89 (shown in FIG. 1) of the cells should hang parallel to each other. The lines 20 are then pulled back to stretch out the parachute 12 and tied together either with a separate strap or with a loose overhand knot to keep the Mylar stiffeners 89 parallel.

The now parallel Mylar stiffeners are the last portion of the parachute 12 to be "folded" into the pack. This method greatly reduces the amount of crumpling to the Mylar stiffeners as compared to stuffing the Mylar stiffeners into an envelope-shaped bag. After the open cell (stiffeners 89) lines are tied together, the trailing edge 16 is gathered together, about two to three feet wide, ready for fan folding.

Larger parachutes 12 may be first folded along a left to right axis 70 and then the process described above may be performed.

Figure 8:
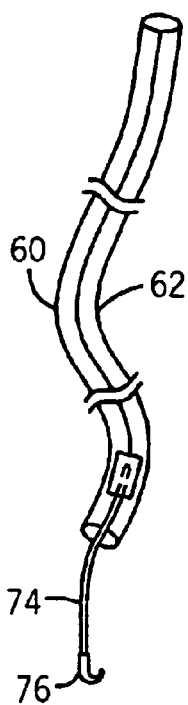
FIG. 8 is a fragmentary view of a line sock such as may be part of the present invention.

For either of these methods, after the parachute 12 is gathered in this row, line socks 60 are placed over the lines 20 to protect them. Referring to FIGS. 5 and 8, the line socks 60 are commercially available tubes of fabric about ten feet long and sized to allow the lines 20 and support cables 22 and 24 to fit therein. Two line socks 60 are used, one for support cable 22 and its associated lines 20 and one for support cable 24 and its associated lines. The line socks 60 have longitudinal seams 62 separable by a zipper or hook and loop fasteners or the like allowing them to receive the lines 20 and support cables 24 without disconnection of the support cables 22 and 24 from the cockpit 28. After the trailing edge 16 of the parachute 12 is pulled onto the center of the storage pack 38 and the line socks 60 are laid along the parachute row and extend over the storage pack 38 extending off the storage pack 38 toward the cockpit 28 over the corners of the center portion 40.

Figure 3:
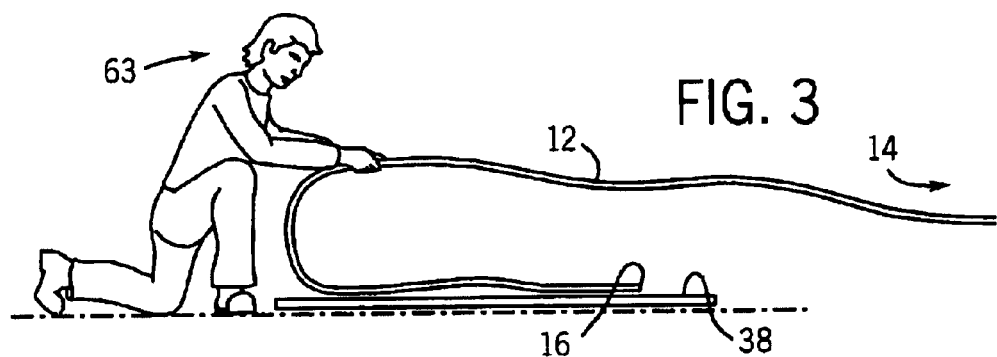
FIGS. 3 and 4 are simplified diagrams showing a fan folding of the parachute of FIG. 2 by a single individual after collecting of the parachute in a row.
Figure 4:
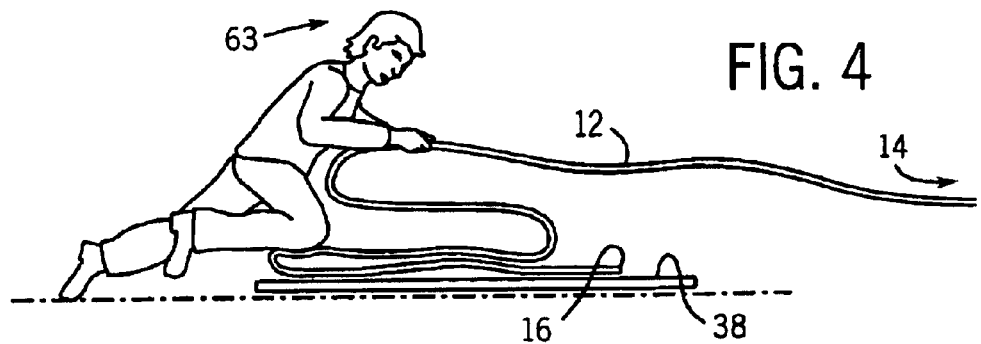

Referring now to FIG. 3, with the parachute 12 and line socks 60 in position, the person 63 packing the parachute, by pulling at successive locations of the parachute 12 from the trailing edge 16 and alternately kneeling on those portions previously gathered, may fan fold the parachute 12 onto the opened material of the storage pack 38. Note in this process, the material of the storage pack 38 protects the parachute 12 from abrasive materials on the ground.

During the fan folding, the person 63 doing the packing may rock back and forth repeatedly kneeling on each new fan fold to squeeze out the air toward the open ends of the cells toward the leading edge 14.

Referring to FIG. 2, when this process is complete, flaps 42a and 42c are pulled about the parachute 12 as tightly as possible. Then the flaps 42b and 42d are pulled tightly about the flaps 42a and 42c and contained parachute 12. The flaps 42 are held to each other by the fastener panels 48 and 50. The flaps 42 overlap to prevent any direct contact between the hook and loop material and the parachute 12 when the parachute 12 is enclosed in the storage pack 38.

The storage pack 38 may then be picked up by straps 52 and carried around to either side of the cockpit 28.

Referring now to FIG. 5, when the storage pack 38 is placed on the right side of the cockpit 28, the left line sock 60 can be placed beneath the propeller guard 37. The storage pack 38 then may be hung, using metal hooks 80, on a horizontal strut 72 being in this case a portion of the outrigger 26 to allow the seat 30 to be used for a second passenger. The right sock 60 may be stuffed into the storage pack 38 or placed on top of the storage pack 38 to be held by bungee cords 54.

Referring momentarily to FIG. 8, and FIG. 5, an elastic bungee cord 74, having a hook 76 on one end and a fabric patch on the other, may be attached to the lower sock 60 allowing the sock 60 to be attached to the structure of the cockpit 28 to prevent looseness in the sock 60 that would allow it to be caught or dragged on the ground. The particular location for the point of attachment of the bungee cord 74 to the sock 60 may be determined by the user based on the particular structure of the powered parachute 10. The fabric patch of the bungee cord 74 may be initially attached to the sock 60 by means of safety pins and later sewn in place. Areas of sharpness in the structure of the cockpit 28 over which the sock 60 passes may be padded with foam and tape or the like.

Referring flow to FIGS. 6 and 7, a metal hook 80 having an arcuate portion 82 may fit over the strut 72 to provide end loops 84 and 86 serving as attachment points for the attachment loops 53 and bungee cord 54 used to restrain the storage pack 38. End loops 86 of hooks 80 may engage one pair of the attachment loops 53 (depending on the height of support desired). As shown in FIG. 6, the attachment loops 53 are affixed to straps 88 which may pass down and around the remainder of the storage pack 38 to distribute the forces of suspension over the material of the storage pack 38. The end loops 84 of hooks 80 may engage with corresponding hooks of one end of the bungee cords 54 whose other ends are restrained by knots 85 in the bungee cords 54 catching corresponding metal loops 87 sewn to the material of the storage pack 38. The bungee cords 54 may thereby secure storage pack 38 and parachute 12 to the strut 72. The hooks on the bungee cords 54 and straps 88 are preferably non-scratching, for example, nylon, and provide provisions for adjustment of the length of the bungee cord 54 as is well understood in the art.

The pack 28 can be stored either in the back seat 30 of the cockpit 28 or hung from a strut. When stored in the back seat, the bungee 54 with hooks 55 on each end, must be able to stretch a great length at low pressure so that the bungee hooks 55 can reach attachment point on the cockpit 28. When the pack 38 is hung from a strut 72, the bungee 54 must stretch a shorter distance at high pressure to securely hold the pack 38 to the strut 72. The knot 85 in the middle of the bungee 54, along with the metal loop 87, allows bungee 54 to perform both functions with little or no adjustment to the overall length of bungee 54. When the bungee hooks 55 are released from either storage method, they automatically retract under bungee cover 59 for storage. This packing system has no loose bungee hooks or straps. All are built into the pack 38.

It is specifically intended that the present invention not be limited to the embodiments and illustrations contained herein, but include modified forms of those embodiments including portions of the embodiments and combinations of elements of different embodiments as come within the scope of the following claims.

I claim:

1. A parachute pack for powered parachutes comprising:
   a sheet of flexible material, in a first state openable to lie substantially flat against a ground surface and sized to receive a parachute thereupon, the sheet having a common center portion assembled at its edge to four, pairwise opposed flaps; and
   fasteners positioned near edges of the flaps to allow the edges of the flaps to be drawn over the received parachute in a second state, to enclose the parachute, the fasteners interconnecting to releasably retain the edges to each other;

wherein the four, pairwise opposed flaps have overlapping flap corners at corners of a common center portion to which they are attached.

2. The parachute pack of claim 1 wherein the fasteners are hook and loop fasteners.

3. The parachute pack of claim 1 wherein the fasteners provide a range of connection points to allow adjustment of a volume enclosed by the sheet in the second state.

4. The parachute pack of claim 1 wherein the edges of the sheet extend in four, pairwise opposed flaps and wherein the fasteners are positioned on edges of the flaps.

5. The parachute pack of claim 1 wherein the sheet is a fabric.

6. The parachute pack of claim 1 wherein the sheet further includes a storage cover holding stretchable straps terminating in hooks and sized to retain the enclosed parachute as wrapped in the sheet to structure of a cockpit of the powered parachute, the stretchable straps sized to substantially retract into the storage cover when not in use.

7. A parachute pack for powered parachutes comprising:

a sheet of flexible material, in a first state openable to lie substantially flat against a ground surface and sized to receive a parachute thereupon; and fasteners positioned near edges of the sheet to allow the edges of the sheet to be drawn over the received parachute in a second state, to enclose the parachute, the fasteners interconnecting to releasably retain the edges to each other;

wherein the sheet further includes a storage cover holding stretchable straps terminating in hooks and sized retain the enclosed parachute as wrapped in the sheet to structure of a cockpit of the powered parachute, the stretchable straps sized to substantially retract into the storage; and wherein the stretchable straps include a stop attached in a middle portion of the strap and wherein the strap is further retained by a loop attached to the sheet and interacting with the stop to affect the amount the stretchable strap stretches depending on whether one or both ends of the stretchable strap are attached to the structure.

8. A parachute storage kit for a powered parachute comprising:

(a) a sheet of flexible material, in a first state openable to lie substantially flat against a ground surface and sized to receive a parachute thereupon, the sheet having attached fasteners positioned near edges of the sheet to allow the edges of the sheet to be drawn over the received parachute in a second state to enclose the parachute, the fasteners interconnecting to releasably retain the edges to each other enclosing the received parachute; and (b) socks comprising a tubular sleeve of flexible material separable along their length by a releasable fastening means, the socks sized to substantially cover lines attaching the parachute to a power parachute cockpit.

9. The parachute storage kit of claim 8 including further stretchable fastening straps sized to hold the parachute enclosed in the sheet against structure of the cockpit.

10. The parachute storage kit of claim 8 including a rigid hook sized to engage a strut of the cockpit and providing for attachment points for at least one stretchable fastening strap.

11. The parachute storage kit of claim 8 wherein the sheet includes a storage cover holding the stretchable fastening straps terminating in hooks and sized to retain the enclosed parachute as wrapped in the sheet to structure of a cockpit of the powered parachute, the stretchable straps sized to substantially retract into the storage cover when not in use.

* * * * *

UNITED STATES PATENT AND TRADEMARK OFFICE
CERTIFICATE OF CORRECTION

PATENT NO. : 6,776,374 B2
DATED : August 17, 2004
INVENTOR(S) : Jack C. LaSee

It is certified that error appears in the above-identified patent and that said Letters Patent is hereby corrected as shown below:

Column 6,
Line 15, "Referring flow to" should be -- Referring now to --.

Signed and Sealed this

Fourteenth Day of December, 2004

JON W. DUDAS
*Director of the United States Patent and Trademark Office*